United States Patent [19]

Eaton-Williams

[11] Patent Number: 4,935,601

[45] Date of Patent: Jun. 19, 1990

[54] AUTOMATIC CONTROL CIRCUITRY FOR AN ELECTRODE BOILER HUMIDIFIER

[76] Inventor: Raymond H. Eaton-Williams, "Heathers", Farnaby Drive, Sevenoaks, Kent TN13 2LQ, England

[21] Appl. No.: 47,302

[22] Filed: May 5, 1987

[30] Foreign Application Priority Data

May 9, 1986 [GB] United Kingdom ................ 8611305

[51] Int. Cl.$^5$ ............................................. H05B 1/02
[52] U.S. Cl. .................................. 219/295; 219/486; 219/483; 219/508; 219/501; 323/236; 307/38; 307/41
[58] Field of Search ........ 219/295, 283, 273, 483–486, 219/497, 494, 501, 507–509; 338/80–86; 307/117, 38–41; 323/235, 236, 319, 285

[56] References Cited

U.S. PATENT DOCUMENTS

| | | | |
|---|---|---|---|
| 3,944,785 | 3/1976 | Eaton-Williams | 219/295 |
| 4,046,991 | 9/1977 | Sefton et al. | 219/497 |
| 4,410,794 | 10/1983 | Williams | 219/486 |
| 4,511,790 | 4/1985 | Kozak | 219/486 |
| 4,588,875 | 5/1986 | Kozak et al. | 219/486 |
| 4,617,453 | 10/1986 | Kumon | 219/486 |

Primary Examiner—M. H. Paschall
Attorney, Agent, or Firm—Berman, Aisenberg & Platt

[57] ABSTRACT

A humidifier boiler has a plurality of electrodes supplied with electric current through circuitry which includes at least one solid state switch or relay such as inverse parallel thyristors or triacs arranged to switch at zero voltage so that, when the humidifier is called upon to vary the quantity of water vapor output from the boiler through an outlet pipe in response to a control signal from a humidity controller, the control signal causes the duration of the "on" and/or "off" periods of the, or each, solid state switch or relay to be varied in order to vary the power to the electrodes.

8 Claims, 4 Drawing Sheets

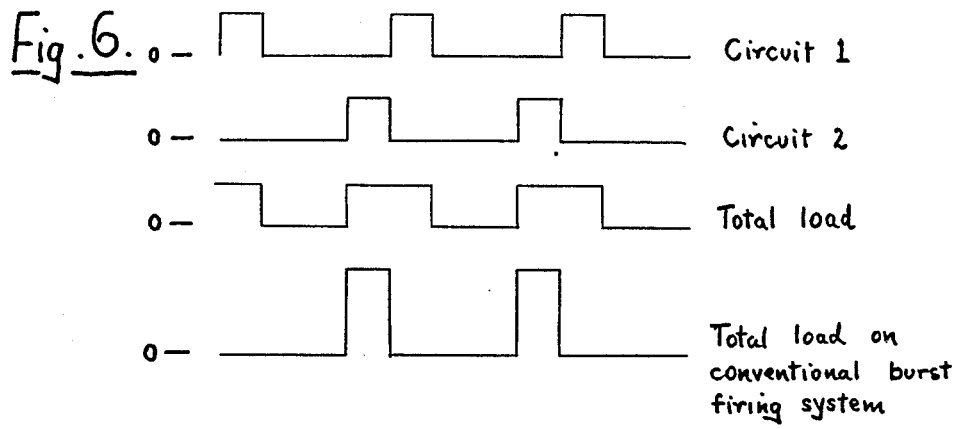
Fig. 6. 25% Demand, 2 circuits
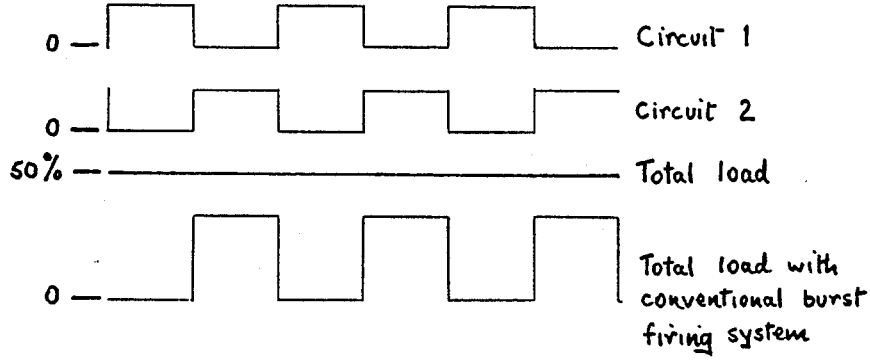
Fig. 7. 50% Demand, 2 circuits
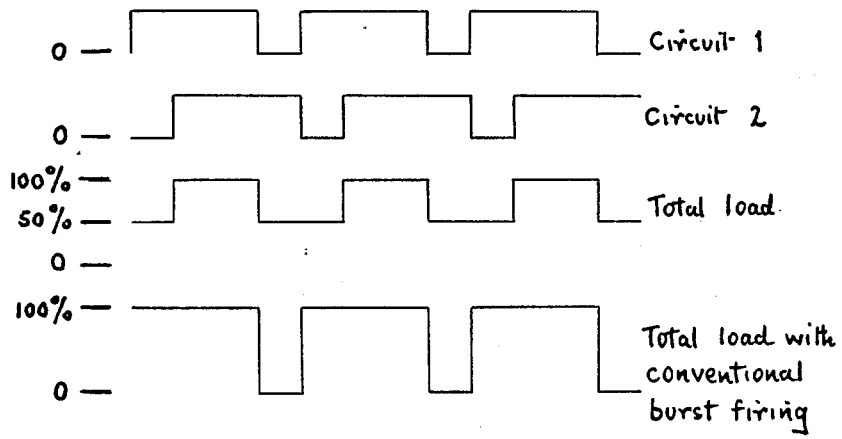
Fig. 8. 75% Demand, 2 circuits

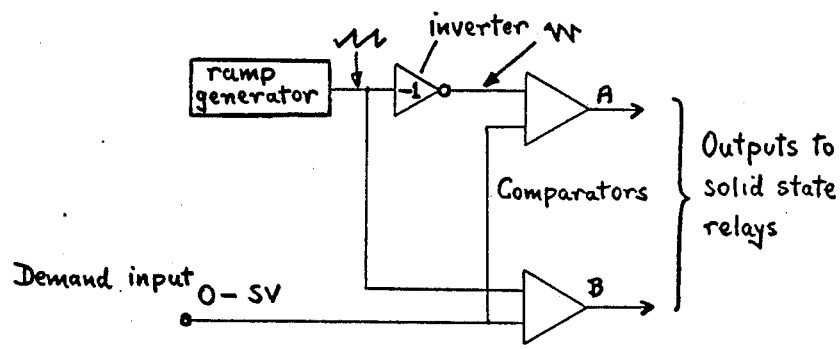
Fig. 9. Two output burst firing
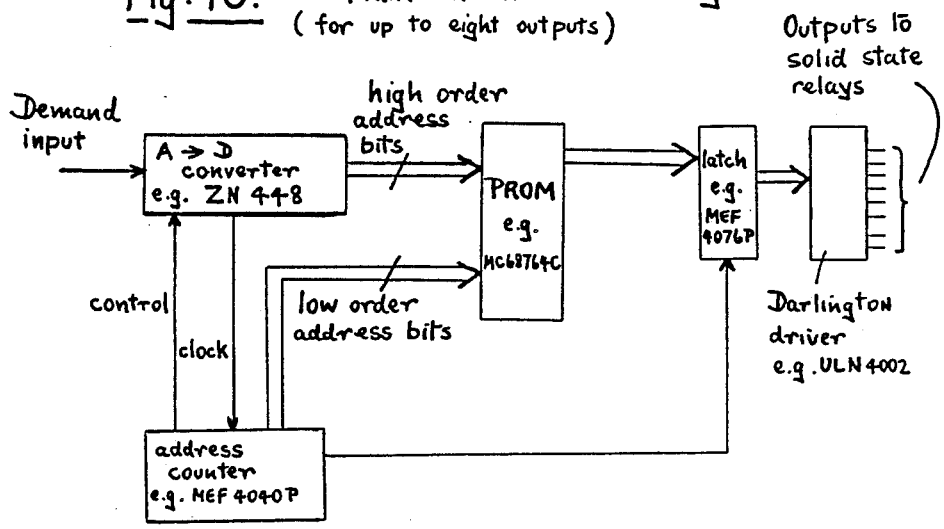
Fig. 10. Multi circuit burst firing (for up to eight outputs)

AUTOMATIC CONTROL CIRCUITRY FOR AN ELECTRODE BOILER HUMIDIFIER

This invention relates to humidifier control means, especially for the control of electrode boiler humidifiers.

In humidifiers used for adding water vapour to the air in air conditioning, it is useful to be able to vary the quantity of water vapour output in response to a control signal. In the simplest form of output control, an on/off switch may vary the output between two positions providing either zero output or 100% output. Alternatively, a step switch or a series of switches operating in sequence may provide stepped output giving, as one example, say 0%, 25%, 50%, 75% and 100% output. Yet another alternative is for an analogue control signal to vary the output between a fixed lower limit of between 0% and 10% and a higher limit of 100%, the output being approximately proportional to the amplitude of the analogue control signal.

in electrode boiler humidifiers, commonly used methods of varying the output include varying the height of immersion of the electrodes in the water so as to vary the area of the electrode(s) in contact with the water and hence the electrode current as described in my U.K. Pat. Nos. 1,139,911 and 1,381,113, or switching the electrical power to varying numbers of electrodes in a multi-electrode boiler as described in my U.K. Pat. No. 2,0728898B.

In the case of varying the height of immersion of the electrodes, this is usually achieved by discharging water from the boiler to reduce output and by feeding water to the boiler to increase output. This method has several disadvantages. When water leaves the boiler to reduce output, energy is lost from the system as this water is at boiling temperature and is usually thrown away into the drain. Water subsequently entering the boiler to increase output and replace that discharged must then be heated to boiling temperature and this requires additional energy and may also cause a delay in response while the water is heated, particularly if the required increament of output is large. Futhermore, if a useful ration of maximum to minimum output is to be achived such as for example, ten to one, then the area of immersed electrode must also vary by ten to one. This implies very precise control of the other boiler parameters, such as water conductivity, as otherwise the area of electrode covered at minimum demand may be too small for reliable operation, particularly of the water feed and discharge control, and at maximum demand maximum output may not be achievable even with the electrodes fully immersed. After successive decreases and increases of output, a substantial amount of higher conductivity water in the boiler may have been lost from the system, thereby reducing the operating conductivity of the water between the electrodes. In this event it will be impossible to achieve maximum output until a considerable time has elapsed during which re-concentration of the water in the boiler has taken place. These problems may be particularly troublesome in situations where the incoming water quality is of unusually high or low mineral content, or where the quality of the incoming water varies.

In the case of switching the power to varying number of electrodes, other limitations exist. Firstly, continuous proportional control cannot be achieved as the output is varied in fixed steps and a large number of electrodes is needed to achieve relatively small incremental steps. Scondly, after prolonged operation at varying outputs the electrodes may become scaled unequally, resulting in an imbalance of electrode currents.

The aim of the present invention is to provide control means for a humidifier, especially an electrode boiler humidifier, which respond quickly and in which the output follows the amplitude of the control signal with minimum delay. A further aim is to provide a system which does not use additional energy as a result of the output control functiona and which will allow the boiler to operate reliably through substantially the full range of output of at least ten to one and over a wide range of incoming water quality.

This result is achieved, in accordance with the invention, by control means comprising one or more solid state switches or relays — such as inverse parallel thyristors or triacs arranged to switch at zero voltage — with the duration of either the "on" periods or the "off" periods of the switch or each switch — or the duration of both "on" periods and "off" periods — being varied to meet fluctuations in the demand on the humidifier.

In the case of a multi-electrode boiler, the power to the electrodes can be switched by the control means in a periodic way with variable "on" periods and variable "off" periods such that the average power input to the boiler as measured over a number of such periods may be varied in the desired ratio of typically ten to one by varying the lengths of the "on" and "off" periods and, where the periods are of sufficiently short duration, that any resulting cyclic variation in water vapour output will not produce a significanly advarse effect on the humidification process.

An important advantage of using solid state switches including either inverse parallel thyristors or triacs arranged to switch at zero voltage is that this permits relatively rapid switching — for example with periods of ten seconds down to one cycle of the electrocity supply — without causing electromagnetic interference.

The control means of the invention are particulalarly advantageous when used in conjunction with a boiler control system similar to that described in my U.K. Pat. No. 1,418,994. In this boiler control system the water feed to the boiler and the water discharge from the boiler are controlled as a result of measuring the electrode current and sensing water level in a way which allows the conductivity of the water in the boiler to increase until a required level of conductivity is reached to provide the desired output and then to control the conductivity to maintain this desired output. It is to be understood, however, that the control means for the invention may be used in conjunction with other electrode boiler control systems — for example that described in my U. K. Pat. No. 1,381,113 — as well as in humidifiers which are heating elements other than electrodes to heat the water.

It is usual in boiler control systems for current measuring means to be used to determine the conductivity of the water and to control the supply of feed water to the boiler and the discharge of water from the boiler. The control means will therefore incoroporate a time constant whereby the peak current value sensed during the "on" periods of the power control means is retained or stored during the succesding "off" periods.

In a higher power boiler, having four or more electrodes for single-phase operation, or six or more electrodes for three-phase operation, the time switching of the electrodes may be so arranged as to provide the following further desirable features.

The system provides for all electrodes to be connected for equal total periods of time. At outputs up to 50% (in the case of four or six electrode boilers) two groups of electrodes are switched alternately with "off" periods such that the total duration of the "on" periods provides the necessary power input to satisfy the demand requirement. At exactly 50% output the duration of the "off" periods falls to zero and a constant continuous load is imposed on the electricity supply with one electrode group on for half the time and the other electrode group on for the other half of the time.

At outputs above 50%, overlap of the "on" periods of the two groups occurs until, at 100%, both groups are on all the time. With this arrangement, the instantaneous current drain from the supply varies between zero and 50% of maximum up to 50% demand level and then varies between 50% and 100% of maximum at demand levels between 50% and 100%. This has the advantage of reducing the possibility of imposed flicker on the electricity supply, as compared with a system which would be cycling on and off the full load.

In the same way three electrode groups may be switched similarly to provide intermediate levels of continuous load of one third and two thirds of maximum current at one third and two thirds demand levels. The same system may be extended to four or more electrode groups in the same way.

The advantages given by the control means of the invention, especially when used with electrode boiler humidifiers, may be summarised as follows:

1. It provides continuous control of output in response to an analogue or other control signal typically from 10% to 100%. It provides very rapid response to the control signal and no delay in response is introduced while water is discharge from or refilled intot the boiler. Additionally, there is no delay in response resulting from the time taken to heat fresh water which may otherwise be introduced to increase output up to boiling temperature.

2. Output control takes place at constant water level, so that there is no additional energy loss due to discharging hot water from the system to provide output reduction.

3. Variation of output produced by the system does not have any direct effect upon the conductivity of the water in the boiler.

4. All electrodes are energized for equal periods of time so that unequal scaling is avoided.

Some examples of control means as applied to a multi-electrode boiler humidifier are illustrated in the accompanying drawings, in which:

FIGS. 6-8 are graphs illustrating the variable "on" and "off" periods of the switches incorporated in the control means; and FIGS. 9 and 10 illustrate further developments of the control means shown in the previous Figures.

Figure 1:
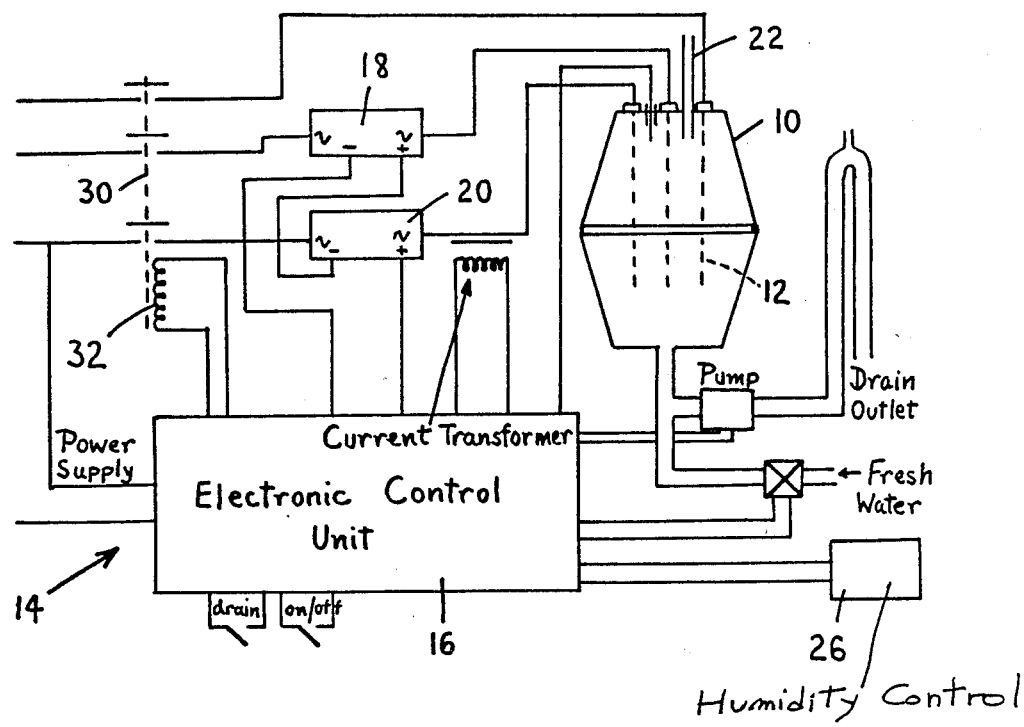
FIG. 1 is a diagrammatic representation of a multi-electrode boiler and its control means.

FIG. 1 shows a humidifier boiler 10 having a plurality of electrodes 12 which are supplied with current controlled by control means 14 incorporating an electronic control unit 16 and solid state switches or relays 18, 20 in the form of inverse parallel thyristors or triacs.

The control means 14 serve to control the output of the humidifier boiler 10 by switching the power to the heating electrodes 12 on and off at regular intervals so that the average power fed to the boiler depends on the ratio of "on" time to "off" time. If required, the repetition rate of the switching may be made sufficiently high that the thermal mass of the water and the effective reservoir of steam in the outlet 22 of the boiler averages the steam output to give only small cyclic variations. This form of control avoids the disadvantages listed above for other methods and provides a rapid response to changes in demand for steam. A response time constant of under five seconds is typical. This fast response can confer the extra advantage that the criteria for a closed loop humidity controller to remain stable are more easily realisable.

The solid state switches or relays 18, 20 are switched under the control of an electronic timing circuit within the electronic control unit 16 so that the "on" and "off" ratio can be adjusted. This control can be referred to as variable mark/space ratio burst firing. Most modern solid state relays have the advantage that they are designed to switch only at or near to mains zero crossings, thus reducing radiated interference virtually to nothing. However, it is not possible simply to connect a knonw burst firing controller to the electrode power circuit of an electrode boiler as the functioning of the humidifier would then be impaired and the advantages possible with this control method would not be realised. Specifically, if power is not continuously applied to the electrodes, the determination of the electrode current and hence of the conductivity of the water will not be correct. Special provision must therefore be made in the control unit, as described below in connection with FIGS. 3-5, to compensate for the switching on and off of the electrode power.

Figure 2:
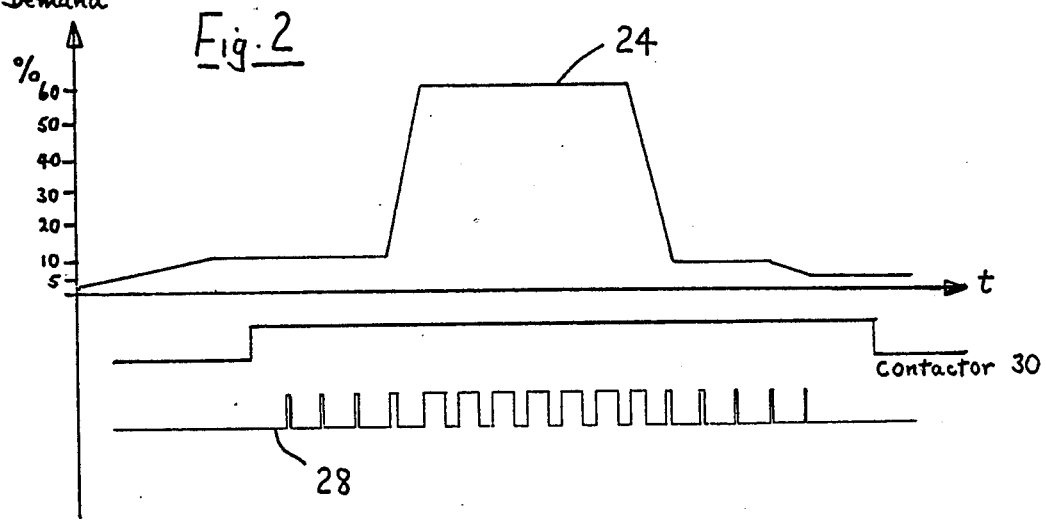
FIG. 2 is a graph illustrating operation of the power control in the boiler.

FIG. 2 illustrate the effect of a varying demand signal 24 on the power control means 14 from humidity control means 26. As can be seen from the line 28, the unit 16 may operate with a very small ratio of "on" time to "off" time. Any burst firing control requires special attention to be given to the current measuring circuit, but the smaller the ratio the more severe is the problem. For this reason, the control means 14 are designed to switch off altogether, and to gate off the control outputs, at a specified lower limit of demand. A certain hysteresis must be provided on this switching function to prevent rapid operation. In a preferred embodiment, the unit 16 starts operating at a demand level of 10%, but if the demand falls the unit 16 continues to operate down to a demand level of 5%.

Figure 3:
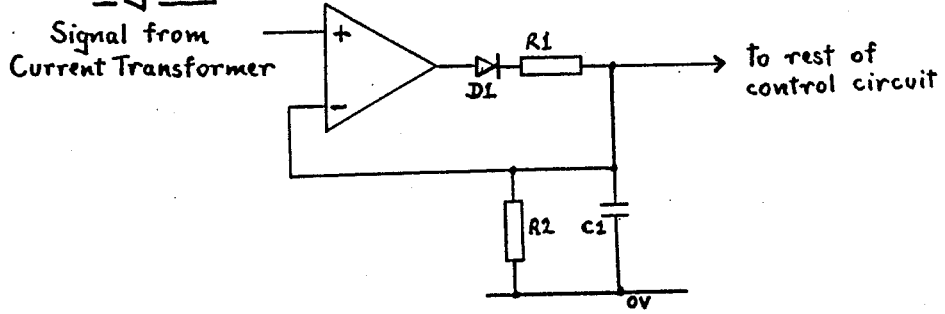
FIGS. 3-5 are detail views of three alternative current storing means incorporated in the control means.
Figure 4:
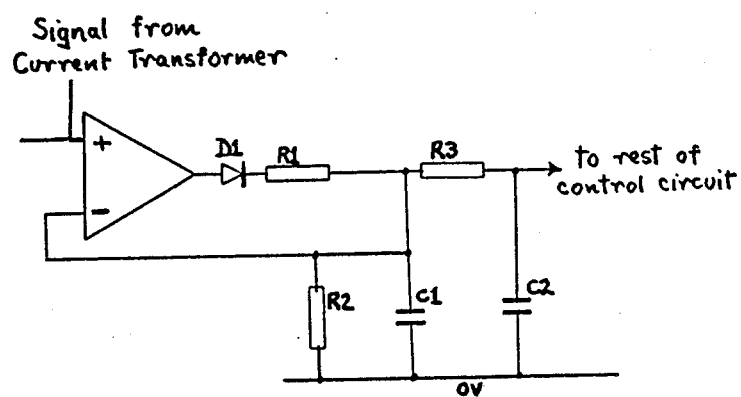
Figure 5:
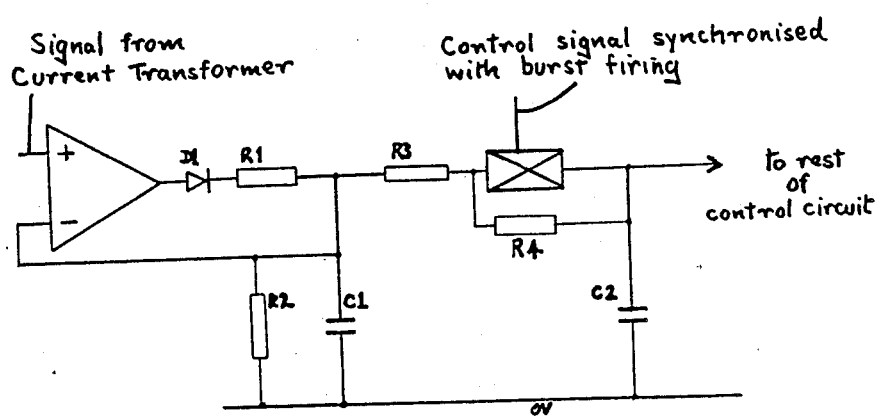

It has been found that a switching rate of 1 Hz provides a sensibly constant steam output, and a preferred embodiment uses this switching rate. Bearing in mind that the solid state relays 18, 20 used to control the power will not switch on until a mains zero crossing, it is possible for the electrode current to be flowing for only two cycles per second. This places severe constraints on the current meassuing circuit forming part of the unit 16. Accordingly, three simple circuit configurations designed to overcome this problem are shown in FIGS. 3-5 and will now be described. All three circuit configurations are included in the unit 16 and rely on measuring the positive peak current and inferring the mean current during the "on" times from this.

FIG. 3 shows the simplest configurations, in which a peak detector with a long time contant is used to store the peak value of the current over the burst firing period. The time constant R2.C1 is chosen to be much longer than the burst firing period, both to minimise voltage droop during the "off" period and to keep the level of ripple low and thus avoid disturbance to the functioning of subsequent control circuitry. This latter criterion is the most important one, because although a small percentage change in operating point might be tolerated at minimum demand, chattering of a control valve would certainly not be acceptable. Resistor R1 is there to prevent C1 from being charged significantly by brief impulse interference "spikes" on the mains supply.

The time constant needed to reduce the ripple on the output to negligible levels is very long. The circuit of FIG. 4 accordingly adds a separate stage of filtering, acting somewhat like a second order filter to provide a sharper frequency cut-off. In this application the result is to reduce the output ripple to acceptable levels without giving an unacceptably long response time to changes in current. A time constant of R3 and C2 of approximately three times the burst firing time period is suitable for this.

The circuit of FIG. 4 does not give perfect performance, in that the voltage output is slightly reduced at very low duty cycles of burst firing. The circuit of FIG. 5 is however designed to render this voltage reduction negligible. The basic peak detector part of the circuit has a much shorter time constant than that of FIG. 3. It is intended only to hold the peak voltage with negligible droop between mains cycles, rather than between burst firing cycles. The value of this peak is retained on C2 between burst firing cycles, with C2 being connected to C1 via the electronically-controlled switch and R3 during the power on time of the burst firing. The value of R3 is low, its purpose being to provide extra rejection of mains spikes and to limit the peak current in the electronic switch. R4 on the other hand has a very high value because its only purpose is to leak away the charge on C2 if the burst firing ceases due to low demand signal.

The three circuit configurations shown in FIGS. 3–5 respond differently to rapid changes in current. Normally rapid changes should not take place, but during the "drain cycle" when water is drained out of the boiler to reduce the conductivity of the water the measured current must give a reasonable representation of the change. This is because the depth of drain is normally controlled as a function of the measured current.

Each circuit will respond faster than the previous one, without any correponding drawback. The only exception to this is that the circuit of FIG. 5 may respond slowly if a drain cycle occurs during minimum demand when the burst firing mark/space ratio is very small. The rest of the control circuit can easily be arranged to increase the mark-to-space ratio briefly during the drain cycle if the system requires it. The circuit of FIG. 5 could also be adapted for use with average current measurement or withy an RMS converter.

The general diagram shown in FIG. 1 indicates that only two solid state relays 18 and 20 are provided for a three-phase system. The obvious result of this is that it is possible for one electrode or set of electrode to be "live" when the control means 16 are apparently not in operation. If the mains power remains connected, and the demand for humidity remains at zero, this can persist indefinitely. For several reasons this is undesirable.

For example, there is the possibility of unauthorised tampering with the equipment by someone not realising his danger. Even if three solid state relays were used, the situation would not be ideal because there is always a certain amount of leakage through a solid state relay which is turned off.

To avoid this undesirable situation a three-phase contactor 30 is installed in the system. It is so arranged that it is switched off during periods of zero demand. If a contactor is switched on and off during periods when current is flowing, arcing occurs at the contacts and eventually this causes failure. In very high powered systems this can have a significant effect on the mean time between failure for the equipment. To maximise the life of the contactor, the control means 16 switch it on or off only when the solid state relays are off, so that the heating current is not flowing.

FIG. 2 shows the effect of a varying demand for humidity. When the demand exceeds the "switch-on" level, 10% in this example, the control means 14 switch to the operating mode. After a short time delay, the contactor operating coil 32 is energised, and after a further time delay the burst firing commences. After a period of time the damand level 24 is shown rising, and the burst firing mask/space ratio rises correspondingly from 10% to 60%. Later the demand falls again, but the control means 14 do not switch to the non-operating mode until the demand falls below the predetermined switch-off level, in this case 5%. After a delay the burst firing ceases, and after a further delay the contactor 30 switches off. In this example a burst firing clock is used in conjuction with a synchronous logic circuit to time the delay, but any timing means would be suitable.

The application of burst firing to high output humidifiers, of the type which have multiple sets of three-phase electrodes, may cause unacceptably large variation of load on the power supply. This effect could be reduced by applying burst firing to only one set of electrodes, and switching on power to other sets so that they form a static base load as required. For example, in a system having two sets of electrodes, burst firing would be applied to one set of electrodes, and the other set would be switched off for all demand below 50%, and on for demands above 50%. However, there is a serious drawback to this scheme. The time for which each set of electrodes is in use will be dissimilar in almost all cases, so scaling on the electrodes will also be uneven. This could give rise to the situation in which the boiler must be changed because one set of electrodes is unusable while the other set is in good condition. If the scale could be evenly distributed between the two sets of electrodes then the useful boiler like would be greater, so the case of uneven scaling could be regarded as premature failure.

With a view to overcoming this problem, FIGS. 6–8 illustrate multi-circuit burst firing schemes which prevent uneven scaling and thus obtain maximum useful life from the boiler. These timing diagrams show the effects of different demand levels on the load current in this system as compared with a single circuit burst firing system. An electronic system capable of generating control signals to produce these timing diagrams is shown in FIG. 9. Detaisl of the circuit diagram are not shown, but any competent worker in this field should be able to fill in appropriate details. In this design, the demand input signal is compared with a ramp waveform and with its inverse. Taking the ramp reset point as the time zero reference, output A may be regarded as starting earlier than zero in proportion to the demand input, and finishing at zero. Output B starts at zero and finishes later in proportion to the value of the demand input.

The multi-circuit principle is not limited to two circuits only. FIG. 10 shows a scheme suitable for up to eight outputs. In this scheme a PROM is programmed with a series of look-up tables giving sequences of output switching for eight outputs. An address counter constantly steps through this table, so that the eight data outputs of the PROM provide suitable control signals for eight solid state relays. The demand input is converted to a binary number which is used to select which loop-up table is being addressed by the address counter. Thus, a demand input which was below the minimum output level determined for the design would select tables in which all outputs were off all the time, while a maximum demand level which would set all the output bits of the analogue to digital converter to logic 1 would select a table in which all outputs were on all the time.

A preferred choice of table structure would operate outputs contiguously in time at low demand levels when there exists a period of time during which no outputs are on. Subsequent tables should be arranged to produce a maximum load variation over a burst firing cycle of 1/n where n is the number of outputs. Thus, at a demand level of just over ⅛ with a brief step up to ¼ once per burst firing cycle. This principle is illustrated simply in the timing diagrams of the two output system where the maximum step in the load current is equal to half the maximum load current.

This form of control also applies to implementations in which the phasing of the outputs is not as illustrated here, and the outputs are not programmed to switch in a time continuous manner. The principles discussed here may all be implemented in a microprocessor based control system. In this case, the measurement of electrode current could be very accurate, because the microprocessor could be programmed to calculate a root mean square value of the current during the "on" time which the microprocessor has set for that electrode. The microprocessor-based controller could also provide the multi-output burst firing timing without the aid of a series of look-up tables. A suitable algorithm could be used to calculate the required output sequencing.

I claim:

1. In a boiler humidifier having a plurality of electrodes, automatic control circuitry for controlling the output of the boiler humidifier comprising a power supply connected to the electrodes of the boiler, control means for producing signals in accordance with the demand on the humidifier, at least one switch for switching on and off the power supply to at least one electrode of the boiler in accordance with said signals from the control means, the switch being a solid state relay arranged to effect rapid switching at zero voltage between "on" periods and "off" periods with the duration of the "on" periods and/or the "off" periods being variable so as to provide for burst fire control of the current supply to the electrodes in order to meet fluctuations in the demand on the humidifier, and current measuring means adapted to measure the positive peak current value during the "on" periods only of the solid state relay and having current storage means adapted to retain this positive peak value stored during the succeeding "off" periods.

2. Automatic control circuitry in an electrode boiler humidifier according to claim 1 wherein the boiler humidifier has at least six electrodes for three-phase operation, comprising a first solid state relay associated with a first group of said electrodes and a second solid state relay associated with a second group of said electrodes, said respective solid state relays of said two groups of electrodes being arranged to be switched alternately with "off" periods at electrical power outputs to a predetermined intermediate value whereby the total duration of the "on" periods provides the necessary power input to satisfy the demand requirement, said respective solid state relays also being so adapted that, when the output reaches said intermediate value, the duration of the "off" periods falls to zero and a constant continuous load is imposed on the supply with one electrode group "on" for half the time and the other electrode group "on" for the other half of the time.

3. Automatic control circuitry in an electrode boiler humidifier according to claim 1 wherein the boiler humidifier has three groups of electrodes and the respective solid state relays are arranged to switch the power to the electrodes to provide intermediate levels of continuous load of one-third and two-thirds of maximum current at one-third and two-thirds demand levels.

4. Automatic control circuitry in an electrode boiler humidifier according to claim 1 wherein the boiler humidifier has four groups of electrodes and the respective solid state relays are arranged to switch the power to the electrodes to provide intermediate levels of continuous load of one-quarter, one-half and three-quarters of maximum current at one-quarter, one-half and three-quarter demand levels.

5. Automatic control circuitry in an electrode boiler humidifier according to claim 1, wherein the solid state relay comprises triacs.

6. Automatic control circuitry in an electrode boiler humidifier according to claim 1, wherein the solid state relay comprises inverse parallel thyristors.

7. Automatic control circuitry in an electrode boiler humidifier according to claim 1 wherein the boiler humidifier has at least four electrodes for single-phase operation, comprising a first solid state relay associated with a first group of said electrodes and a second solid state relay associated with a second group of said electrodes, said respective solid state relays of said two groups of electrodes being arranged to be switched alternately with "off" periods at electrical power outputs up to a predetermined intermediate value whereby the total duration of the "on" periods provides the necessary power input to satisfy the demand requirement, said respective solid state relays also being so adapted that, when the output reaches said intermediate value, the duration of the "off" periods falls to zero and a constant continuous load is imposed on the supply with one electrode group "on" for half the time and the other electrode group "off" for the other half of the time.

8. Automatic control circuitry in an electrode boiler humidifier according to claim 7 wherein, at outputs above the predetermined intermediate value, overlap of the "on" periods of the two groups of electrodes occurs until, at full load, both groups are "on" all the time.

* * * * *